(12) United States Patent
Kim

(10) Patent No.: US 7,788,688 B2
(45) Date of Patent: Aug. 31, 2010

(54) DIGITAL TV AND METHOD FOR MANAGING PROGRAM INFORMATION

(75) Inventor: Ick Hwan Kim, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 1474 days.

(21) Appl. No.: 10/414,300

(22) Filed: Apr. 16, 2003

(65) Prior Publication Data

US 2004/0040037 A1     Feb. 26, 2004

(30) Foreign Application Priority Data

Aug. 22, 2002   (KR) ..................... 10-2002-0049749

(51) Int. Cl.
  *H04N 5/445*   (2006.01)
  *G06F 3/00*    (2006.01)
  *G06F 13/00*   (2006.01)

(52) U.S. Cl. .......................... 725/40; 725/44
(58) Field of Classification Search ................... 725/40
  See application file for complete search history.

(56) References Cited

U.S. PATENT DOCUMENTS 6,829,781 B1 * 12/2004 Bhagavath et al. ............ 725/94
6,842,653 B2 * 1/2005 Weishut et al. ................ 700/83
7,146,627 B1 * 12/2006 Ismail et al. .................. 725/47
2002/0013941 A1 * 1/2002 Ward et al. .................... 725/25
2002/0116471 A1 * 8/2002 Shteyn ........................ 709/217
2003/0028871 A1 * 2/2003 Wang et al. .................... 725/9
2005/0141864 A1 * 6/2005 Sezan et al. ................... 386/69
2006/0064716 A1 * 3/2006 Sull et al. ..................... 725/37
2007/0130595 A1 * 6/2007 McElhatten et al. .......... 725/88

FOREIGN PATENT DOCUMENTS

CN          1260667 A      7/2000
WO      WO 01/93573 A1    12/2001

* cited by examiner

*Primary Examiner*—Andrew Y Koenig
*Assistant Examiner*—Ricky Chin
(74) *Attorney, Agent, or Firm*—Birch, Stewart, Kolasch & Birch, LLP

(57) ABSTRACT

A method of organizing programming data includes receiving a data stream including programming guide, which includes information describing aspects of broadcast programming; extracting a plot synopsis data from the programming guide relating to a series-type genre broadcasting program; and storing the plot synopsis data in a memory.

27 Claims, 8 Drawing Sheets

FIG. 6

User ID: _____
User Password: _____

FIG. 7

Tom's Series

| 1. Friends |
| 2. The Simpsons |
| 3. Seinfeld |
| 4. That 70's Show |

FIG. 8

| That 70's Show |
|---|
| 7:30 pm to 8:00 pm<br>   sound multiplex broadcasting<br>   Past Episodes<br>      Jan 1<br>      Jan 8<br>   Future Episodes<br>      Jan 15<br>      Jan 22<br>      Jan 29 |

FIG. 9A

| That 70's Show |
|---|
| 7:30 pm to 8:00 pm      Jan 15<br>sound multiplex broadcasting<br>synopsis : <display the synopsis of<br>           the Jan 15 broadcast><br>        •<br>        •<br>        •<br>        •<br>[previous broadcast] [confirm] |

| That 70's Show |
|---|
| 7:30 pm ~ 8:00 pm                                    Jan 8 |
| sound multiplex broadcasting |
| synopsis : <display the synopsis of the Jan 8 broadcast> | confirm  delete

DIGITAL TV AND METHOD FOR MANAGING PROGRAM INFORMATION

CROSS-REFERENCE TO RELATED APPLICATION

This application claims the benefit of the Korean Application No. P2002-49749, filed Aug. 22, 2002, the disclosure of which is hereby incorporated by reference.

BACKGROUND OF THE INVENTION

1. Field of the Invention

The present invention relates to a digital TV and, more particularly, to a digital TV and a method for managing program information thereof to view past and future contents of series-type broadcast programs.

2. Discussion of the Related Art

Recent technical developments in digital TVs include an innovative method of transmitting broadcast signals. The Republic of Korea launched the "Mugungwha" satellite in August of 1996, which started testing digital broadcasting in July of 1996. The Mugungwha satellite broadcasting system is different from earlier satellite broadcasting systems in that it digitally broadcasts at the standard definition TV (SDTV) level, which is similar to terrestrial digital broadcasting.

Along with increased use of digital broadcasting, broadcasting of high definition and high quality audio has begun through, for example, satellite, terrestrial wave and cable. Compared to previous analog TV, the digital broadcasting system has various advantages in addition to high definition and high quality audio.

Digital broadcasting compresses high definition, high quality audio and video (A/V) using a video/audio compression method (MPEG-2 or AC-3) and transfers the compressed A/V to respective users through a satellite, terrestrial or cable band using, for example, QPSK, VSB or QAM transmission methods.

This compression technology enables the provision of one channel with various services. With a terrestrial wave, a single channel can be provided with at least four channels at the standard definition (SD) level or one channel for the high definition (HD) level. In order for digital TV to provide various services, additional information is transmitted together with the A/V. This information enables the digital TV to provide services such as a broadcast program guide for a greater number of channels.

An illustration of the digital TV and of the functions of a related art broadcasting program guide are shown in FIGS. 1, 2, 3A, and 3B.

FIG. 1 is a block diagram of a related art digital TV. FIG. 2 illustrates a screen image of a TV having a broadcast program guide function according to the related art. FIGS. 3A and 3B illustrate screen images of a TV having a detailed information guide according to the related art.

A digital TV, as shown in FIG. 1, includes a channel decoder 10 which selects a channel chosen by a user from broadcast signals received through an antenna and receives the selected signal to be decoded into a digital stream form such as VSB, QPSK or QAM in accordance with transmission type. A demultiplexing unit 20 receives the digital stream decoded by the channel decoder 10 and separates the digital stream into video, audio, and additional information. A microcomputer 30 receives the additional information separated by the demultiplexing unit 20, extracts necessary broadcast information and outputs a control signal in accordance with a user's demand. A video processing unit 40 receives the video signal separated by the demultiplexing unit 20 according to the control signal of the microcomputer 30 to process the video signal into a signal enabled to be displayed on a screen.

The video processing unit 40 includes a video decoder (not shown) which decodes the video signal output from the demultiplexing unit 20. A video display unit 50 enables the signal decoded by the video decoder to be displayed on the screen.

The broadcast program guide function of the above-constituted related art digital TV is similar to a broadcast program guide presented by a newspaper, and enables a user to readily view on the TV screen certain information concerning the programs which are being broadcasted or which are to be broadcast later. This information may include, for example, the title, time schedule, synopsis and the genre of the programs.

An image of a general broadcast program guide is displayed on a screen, as shown in FIG. 2. A user can select a currently broadcast program, such as by highlighting the program within the guide using a remote control. As shown in FIG. 3A, detailed program information is displayed so that the user can determine whether to view the currently broadcast program. The user could also select a program which is not currently being broadcast but which is to be broadcast later. The detailed information about the future program would be displayed, as shown in FIG. 3B.

As mentioned in the above explanation, the previous broadcast program guide function enables the user to obtain detailed information about programs that are being broadcasted or that will be broadcast so the user can view or reserve the program.

However, the related art digital TV system does not provide detailed information about series-type broadcast programs which were previously broadcast. For example, some serial-type programs are shown on a daily or weekly basis, and a user would have no way of viewing detailed information about programs in the series which aired days or weeks before.

SUMMARY OF THE INVENTION

Accordingly, the present invention is directed to a digital TV and a method for managing program information thereof that substantially obviates one or more problems due to limitations and disadvantages of the related art.

An object of the present invention is to provide a digital TV, a digital TV receiver, and/or a method for managing program information which provides a user with information about past, present, and future contents of a series-type broadcast program.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims herein, as well as the appended drawings.

To achieve these objects and other advantages and in accordance with the purpose of the invention, as embodied and broadly described herein, a method of organizing programming data includes receiving a data stream including a programming guide, which includes information describing aspects of broadcast programming; extracting a plot synopsis data from the programming guide relating to a series-type genre broadcasting program; and storing the plot synopsis data in a memory.

In another aspect of the present invention, a method of organizing programming data includes receiving a data stream including a programming guide, which includes information describing aspects of broadcast programming; receiving a user's input selecting one or more program titles for which the user wishes to catalog the plot synopses; extracting the plot synopses data from the programming guide for the programs selected by the user; and storing the program synopses data in a memory.

In a further aspect of the present invention, an apparatus for organizing programming data includes a receiver to receive a data stream including a programming guide, which includes information describing aspects of broadcast programming; a control unit to extract a plot synopsis data from the programming guide relating to a series-type broadcasting program; and a memory to store the plot synopsis data.

It is to be understood that both the foregoing general description and the following detailed description of the present invention are exemplary and explanatory, not limitative, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and, together with the description, serve to explain the principle of the invention. In the drawings:

FIG. 6 illustrates an image of a user ID and password screen of a digital TV according to the present invention;

FIG. 7 illustrates an image of a screen of a digital TV, listing several broadcast series programs for a user according to the present invention.

FIG. 8 illustrates a screen image of a menu of past and future episodes of a series-type program according to the present invention.

FIG. 9A and FIG. 9B illustrate detailed information about an episode of the series-type program selected from the menu of FIG. 8.

DETAILED DESCRIPTION OF THE INVENTION

Reference will now be made in detail to the preferred embodiments of the present invention, examples of which are illustrated in the accompanying drawings. Wherever possible, the same reference numbers are used throughout the drawings to refer to the same or like parts.

Figures 1, 2:
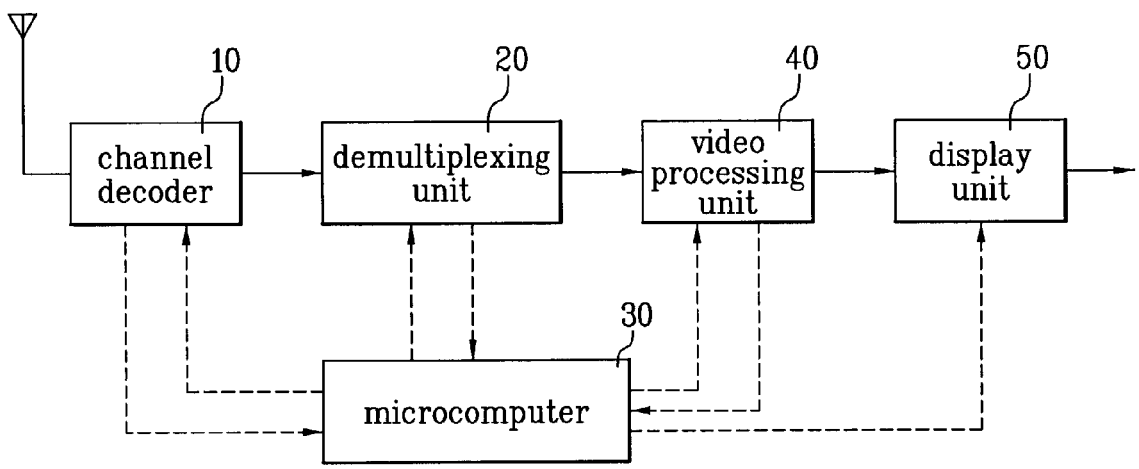
FIG. 1 is a block diagram of a general digital TV in accordance with the background art.
FIG. 2 illustrates a screen image of a TV having a broadcast program guide function according to the background art.
Figure 3A:
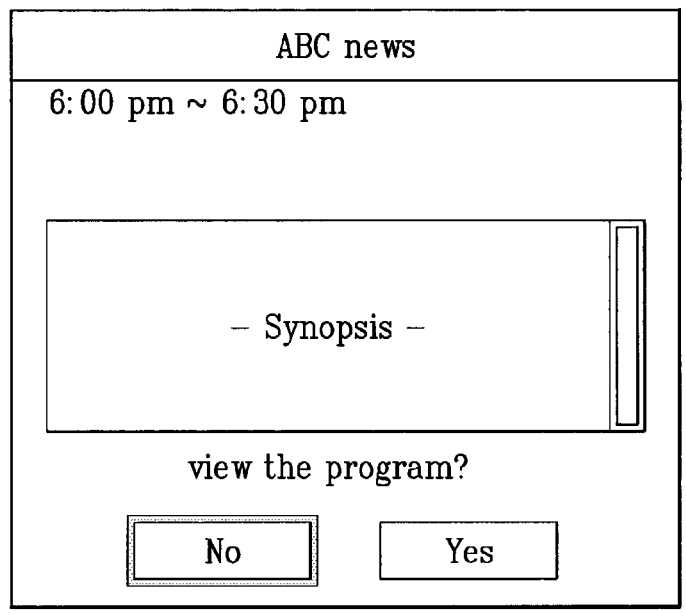
FIG. 3A and FIG. 3B illustrate screen images of a TV having a detailed information guide according to the background art.
Figure 3B:
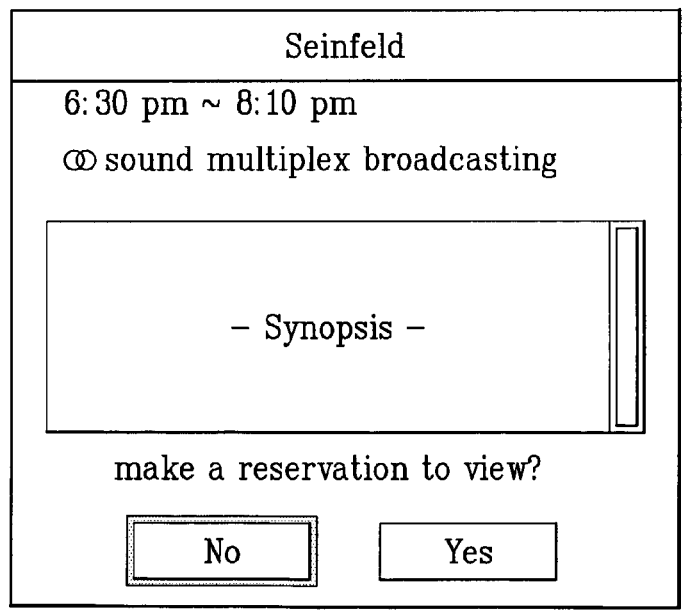
Figure 4:
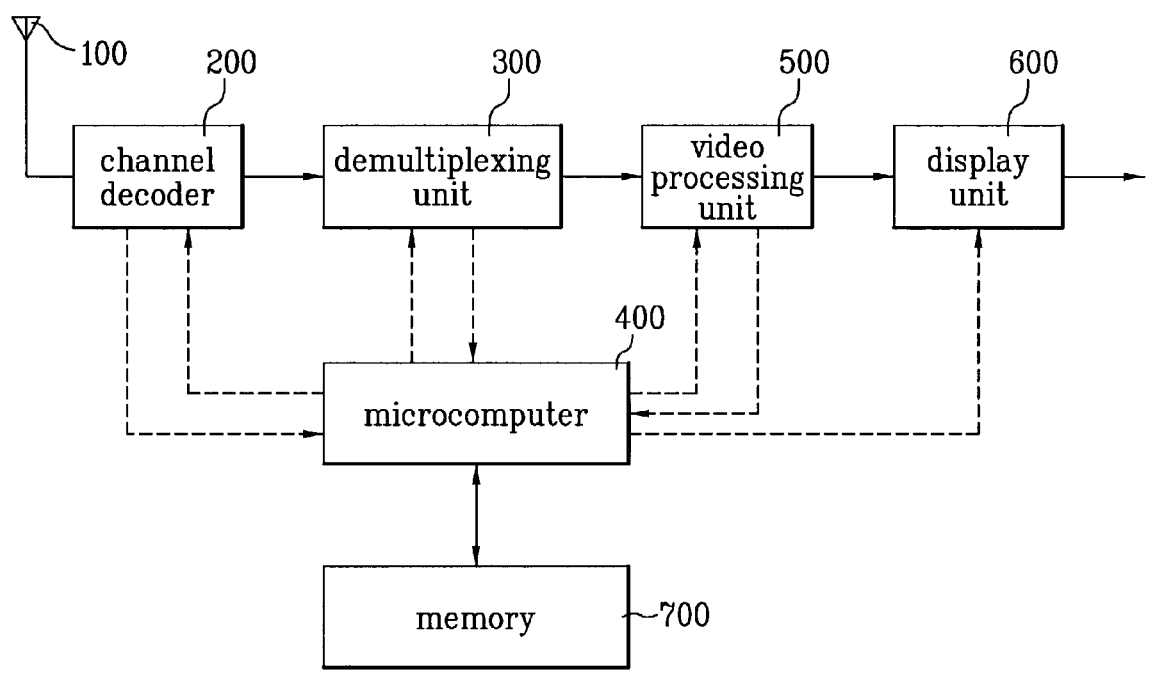
FIG. 4 is a block diagram of a digital TV according to the present invention.

FIG. 4 is a block diagram of a digital TV according to the present invention. As shown in FIG. 4, a digital TV according to the present invention includes a channel decoder 200, a demultiplexing unit 300, a microcomputer 400, a video processing unit 500, a display unit 600, and a memory 700. The channel decoder 200 selects a channel chosen by a user from broadcast signals received through an antenna 100 and receives a signal of the selected channel to be decoded into a digital stream form such as VSB, QPSK, or QAM in accordance with a transmission type. The demultiplexing unit 300 receives the digital stream outputted from the channel decoder 200 and outputs video information, audio information, and additional information. The memory 700 stores program information, which is obtained from the additional information, and user setup information. The memory 700 may be included in the TV or, alternatively, in an internal hard drive of a set top box, such as a satellite or cable receiver set top box.

Additionally or alternatively, the microcomputer may be connected to a modem 710 which may be used to send data to and access data from an Internet or other database server containing a memory which stores the program information. When the user requests information on a series-type broadcast program, the modem 710 sends a request to the server, thereby prompting the server to send detailed data of past, present and future episodes of the series-type broadcast program to the TV or set top box (e.g., a personal video recorder (PVR)). The user can specify the number of episodes of data for which the user desires to view summaries. The microcomputer 400 checks whether a program of the selected channel is a series-type broadcast program using the program information stored in the memory 700, determines whether to store or erase various kinds of information about the respective programs, and outputs a control signal according to a user's demand. The video processing unit 500 receives the video information outputted from the demultiplexing unit 300 and outputs a video signal, enabling an image to be displayed on a screen according to the control signal of the microcomputer 400. The display unit 600 displays the video signal on the screen.

The digital TV according to the present invention selects the channel chosen by the user from the broadcast signals inputted through the antenna 100 and the channel decoder 200, then decodes the selected signal into digital stream form, such as VSB, QPSK or QAM, in accordance with transmission type.

The digital signal inputted to the demultiplexing unit 300 is separated into the video information, the audio information and the additional information. The additional information is stored in a storing means, such as the memory 700, or a database via the microcomputer 400 and modem 710. The video information is implemented into the picture and image through the video processing unit 500. Finally, the audio information is implemented into sound and voice through an audio processing unit (not shown).

The additional information may include, for example, a program association table (PAT), a time date table/time offset table (TDT/TOT), and an event information table (EIT). The PAT may include various kinds of information about the orders of TV programs. The TDT/TOT may include time information of the respective programs. The EIT may include various kinds of information about program titles, program synopses, broadcast program restricting rates, program start and end times, program running times, and program genres.

The program information stored in the memory 700 is updated periodically or regularly. In one embodiment, whenever a user turns on the TV, the program information is updated. In another embodiment, the program information is updated at a predetermined interval established by the user even if the TV is not turned on. When the program information is updated, the microcomputer 400 determines whether the corresponding program is a series-type broadcast program, such as a sitcom, soap opera or other serial, using the genre information of the respective programs and then determines whether to store, delete or ignore the corresponding detailed program information.

A method of managing program information according to a first and a second embodiment of the present invention follows.

Figure 5:
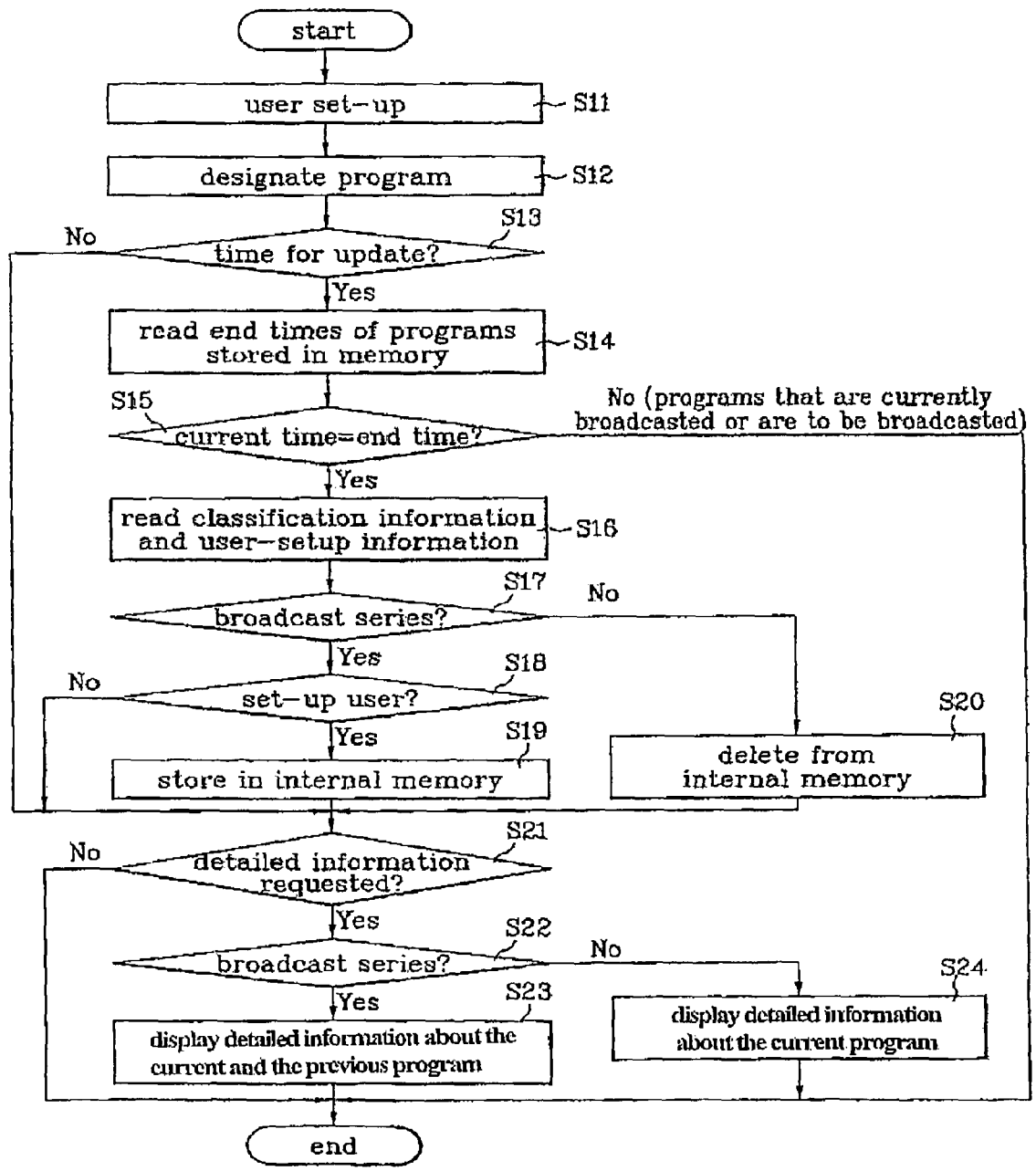
FIG. 5 illustrates a flowchart of a method of managing programming information of a digital TV according to a first embodiment of the present invention.
Figure 9B:
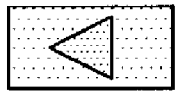
Figure 9B:
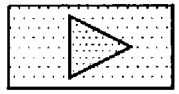

FIG. 5 is a flowchart of a method of managing a program of a digital TV according to first embodiment of the present invention. FIG. 6 illustrates an image of a user ID and password screen of a digital TV according to the present invention. FIG. 7 illustrates an image of a screen of a digital TV listing broadcast series for a user according to the present invention. FIG. 8 illustrates a screen image of a menu of past and future episodes of a series-type program according to the present invention. FIG. 9A and FIG. 9B illustrate detailed information about an episode of the series-type program selected from the menu of FIG. 8.

A user inputs an ID and password, as shown in FIG. 6, through input means (not shown), such as a remote controller, in step S11 of FIG. 5. The user selects a specific channel from broadcast signals received through an antenna 100 and designates a desired series-type program in step S12. The TV displays a menu of broadcast series-type programs reserved by the user, as shown in FIG. 7, so that the user can add, delete and/or select a program. If a program is selected, a user can view synopses of past, present or future episodes of the program, as shown in FIG. 8.

To obtain and store the detailed information about the series-type program, the demultiplexing unit 300 separates the signal outputted from the channel decoder 200 into video information, audio information, and additional information, and inputs the additional information to the microcomputer 400. Meanwhile, the video information is implemented into picture and image through the video processing unit 500 and the audio information is implemented into sound and voice through an audio processing unit (not shown), such that the extraction and analysis of the additional information will not hinder the viewing of programs by the user.

Subsequently, the microcomputer 400 determines whether to update the program information according to an update period set up by a user in step S13. In this case, in order to judge whether to update the program information stored in the memory 700, the microcomputer 400 reads user-setup information stored in the memory 700. The user-setup information includes the update period of the program information, (e.g., every 4 hours, every 8 hours) user authentication information such as a user ID and a user password, and the like.

If it is determined that the program information stored in the memory 700 is to be updated, the microcomputer 400 reads end times of the respective programs from the program information stored in the memory 700 in step S14. The microcomputer 400 compares the end times of the programs to a current time in step S15. If there exists a program that has been previously broadcasted before the current time, the microcomputer 400 reads the genre information and the user authentication information of the corresponding program from the memory 700 in step S16.

It is determined whether the program is a series-type broadcast program by reading genre information in step S17. As a result of the determination in step S17, if the program is a broadcast series, the ID and password which are inputted by the user are compared to the user authentication information to determine whether the current user is an authorized user in step S18. If the current user is an authorized user, the information about the program is stored in the memory 700 as it is in step S19. On the other hand, if the program is not a broadcast series, the information about the program is deleted from the memory in step S20. Namely, even if the program has been broadcast, the information about the program is saved in the memory 700 instead of being deleted, if the program is a broadcast series.

New information about the programs is updated from the additional information while the information about the previously broadcasted program is stored in the memory 700.

When the user requests detailed information of the program on displaying broadcast program guide information in step S21, the above-stored program information verifies whether the program is a broadcast series in step S22. If the program is a broadcast series, then an image, as shown in FIG. 9A, is displayed on the TV screen for the user in step S23 and icons enabling the user to select detailed information about a current broadcast and information about previous broadcasts, respectively, of a program are displayed on the screen. However, if the program is not a broadcast series, current detailed information about the corresponding program is displayed only in step S24.

If the user intends to see the information for the previous broadcast of the program, the user selects an icon corresponding to the previous broadcast to display the information about the previous broadcast, as shown in FIG. 9B. If the user selects a confirmation button, the image is shifted to the previous image. If a left/right arrow button is selected, detailed information about the next/last program centering around the displayed broadcast program is shown on the screen. Moreover, if the user selects a delete button, the corresponding program is erased from an internal memory 700.

Figure 10:
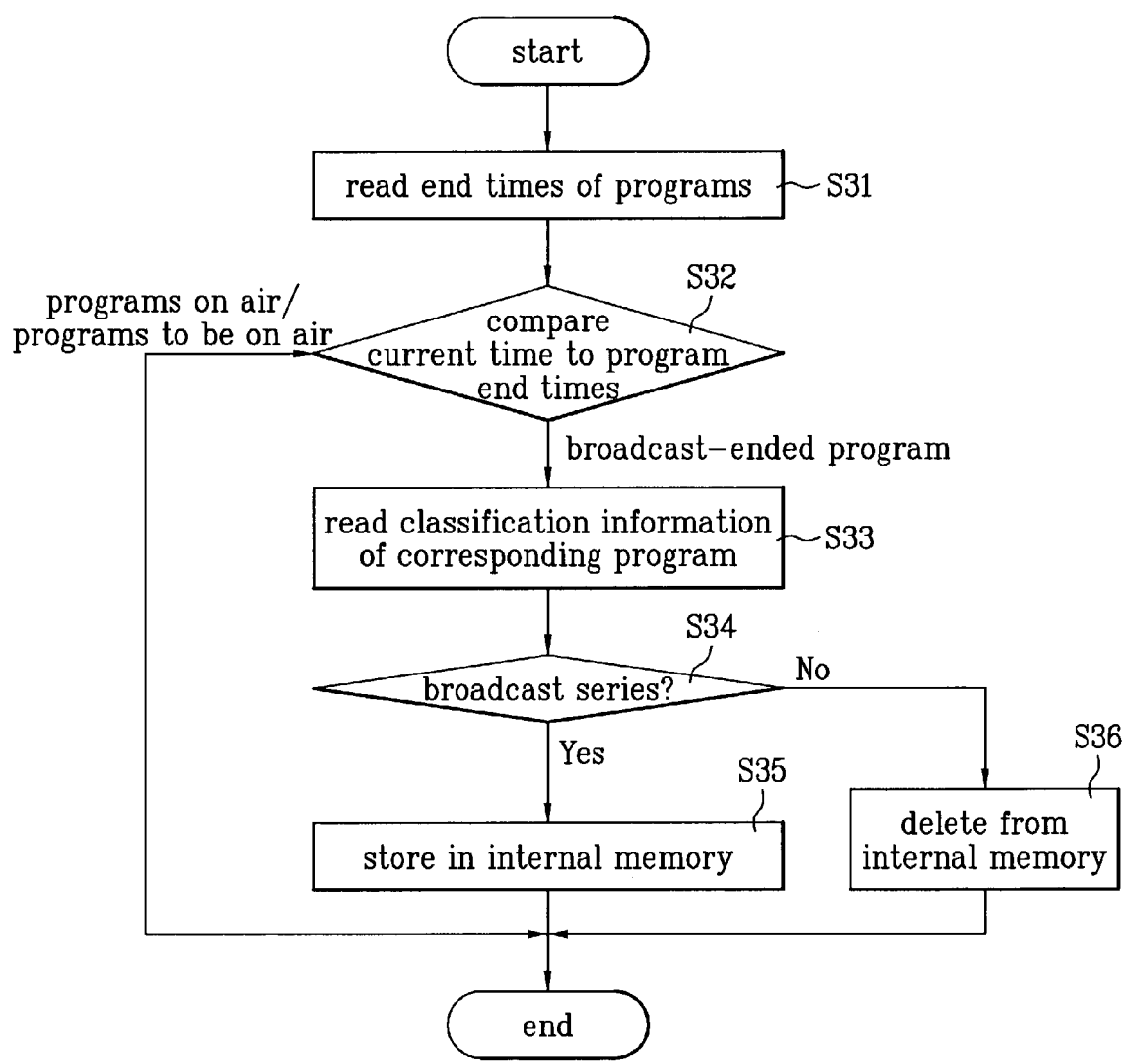
FIG. 10 is a flowchart of a method of managing programming information of a digital TV according to a second embodiment of the present invention.

FIG. 10 illustrates a flowchart of a method of managing a program of a digital TV according to a second embodiment of the present invention. The demultiplexing unit 300 separates broadcast signals received through the antenna 100 into video information, audio information, and additional information and then inputs the additional information to the microcomputer 400.

Subsequently, the microcomputer 400 determines whether to update program information according to an update period set up by a user. If the update period is, for example, an hour, the program information stored in the memory 700 should be updated every hour. If it is determined that the program information stored in the memory 700 needs to be updated, the microcomputer 400 reads end times of the respective programs from the program information stored in the memory 700 in step S31.

The end times of the programs are compared to a current time in step S32, the programs are classified into previously broadcasted programs and the other programs that are currently broadcasted or are to be broadcasted. For the programs that are currently broadcasted or are to be broadcasted, the information about the programs is stored in the memory 700. For the programs determined to be broadcasted before the current time, genre information of the programs is read from the memory 700 in step S33. It is determined whether the programs broadcasted prior to the current time are broadcast series using the read genre information in step S34.

As a result of the determination in step S34, if there exists a program of the broadcast series, the information about the program is left in the memory 700 in step S35. On the other hand, if the programs are not broadcast series, the information about the programs is erased from the memory in step S36. Hence, the information about the programs of the broadcast series among the previously broadcasted programs is stored in the memory 700, while the other information about the programs failing to be a broadcast series is erased from the memory 700 only.

As explained in the foregoing description, the method of managing the program information of the digital TV or set top box according to the present invention updates the broadcast program guide information stored in the internal memory as time elapses. The present invention determines whether the prior information, which used to be automatically erased from the internal memory, is deleted or kept in memory according to the genre information of the corresponding program.

Namely, when the user-setup time comes, a CPU reads the end time information about the broadcast programs of the respective channels from the memory to compare to the current time. If the end time of the program is prior to the current time as a result of the determination (which means that the program has ended), the CPU checks the genre information about the ended program. If the program is a broadcast series and is designated by the user, the CPU stores the information about the program in the internal memory.

Accordingly, the method of managing the program information of the digital TV according to the present invention enables the user to store, delete, and edit a list of broadcast series programs in accordance with the user's preference, and the listed programs will have their detailed information, which include a synopsis of the episode stored in the memory 700. Thus, if the user misses the previous broadcast, the user can view a synopsis of the previous broadcast as well as other broadcast information (actors, guest stars, rating, etc.) to "catchup" on a missed episode in the plot of the series. Therefore, the present invention provides the user with greater convenience in viewing information on the contents of a broadcast series.

It will be apparent to those skilled in the art that various modifications and variations can be made in the present invention. Thus, it is intended that the present invention covers the modifications and variations of this invention provided they come within the scope of the appended claims and their equivalents.

In an alternate embodiment, internet-based mega-memory can store all plot summaries or synopses for all series-based programs. A user selects a desired series-based program, and the user's receiver then accesses the mega-memory to obtain a list of stored plot synopses. Access to the service may be fee-based, for example, by subscription or pay-per-use basis. The alternate embodiment saves memory space on the user's receiver and provides user access to more, e.g., all plot synopses.

What is claimed is:

1. A method of organizing programming data, comprising:
  receiving a data stream including a programming guide, which includes information describing aspects of broadcast programming, and storing the programming guide in a memory;
  determining whether or not a program is a series-type genre broadcasting program by analyzing the genre information associated with the program in the programming guide if the program is determined to be a previously broadcasted program before the current time;
  extracting a plot synopsis data from the programming guide relating to the series-type genre broadcasting program and storing the plot synopsis data in the memory, if the program is determined to be a series-type genre broadcasting program;
  deleting only the information about the program from the memory if the program is determined not to be a series-type genre broadcasting program;
  formulating a menu including a listing of the series-type genre broadcasting programs which have their plot synopsis data stored in the memory;
  selecting at least one of the series-type genre broadcasting programs from the menu; and
  displaying the stored plot synopsis data of a previously broadcasted program associated with the selected series-type genre broadcasting program.

2. The method of organizing programming data according to claim 1, wherein the menu is formulated of programs selected by a user.

3. The method of organizing programming data according to claim 1, wherein said selecting step is accomplished by a user operating a remote control to pick a desired program from the menu.

4. The method of organizing programming data according to claim 1, wherein the information describing aspects of the broadcast programming includes, in addition to the plot synopsis, at least one of a title, a genre, a broadcasting time, and a restriction rating.

5. The method of organizing programming data according to claim 1, wherein said step of storing includes:
  transmitting the data to an internal drive.

6. The method of organizing programming data according to claim 1, wherein said step of storing includes:
  transmitting the data to an external drive via the internet.

7. The method of organizing programming data according to claim 1, wherein said step of determining includes:
  determining whether a program is a series type genre broadcasting program based on information provided by a user and stored in the memory.

8. A method of organizing programming data, comprising:
  receiving a data stream including a programming guide, which includes information describing aspects of broadcast programming and storing the programming guide in a memory;
  determining whether or not a program is a series-type genre broadcasting program by analyzing the genre information associated with the program in the programming guide if the program is determined to be a previously broadcasted program before the current time;
  receiving a user's input selecting one or more program titles of the series-type genre broadcasting program to catalog program synopses;
  extracting the program synopses data from the programming guide relating the series-type genre broadcasting programs selected by the user;
  storing the program synopses data in the memory;
  deleting only the information about the program from the memory if the program is determined not to be a series-type genre broadcasting program selected by the user;
  formulating a menu including a listing of the series-type genre broadcasting programs which have their plot synopsis data stored in the memory;
  selecting at least one of the series-type genre broadcasting programs from the menu; and
  displaying the stored plot synopsis data of a previously broadcasted program associated with the selected series-type genre broadcasting program.

9. The method of organizing programming data according to claim 8, wherein program synopses data stored in the memory is associated with, and accessible by, the user who selected the program titles.

10. The method of organizing programming data according to claim 8, wherein the user's input is received via a remote control unit.

11. The method of organizing programming data according to claim 8, wherein the user's input further includes:
 a user ID; and
 a user password.

12. The method of organizing programming data according to claim 11, wherein the user ID and user password are required to add program titles to a user's selected list of program titles.

13. The method of organizing programming data according to claim 12, wherein the user ID and user password are required to access the program synopses stored in the memory.

14. An apparatus for organizing programming data, comprising:
 a receiver to receive a data stream including a programming guide, which includes information describing aspects of broadcast programming;
 a memory to store the programming guide;
 a control unit to determine whether or not a program is a series-type genre broadcasting program by analyzing the genre information associated with the program in the programming guide if the program is determined to be a previously broadcasted program before the current time and extract program synopses data from the programming guide relating to the series-type genre broadcasting program if the program is determined to be a series-type genre broadcasting program, and delete only the information about the program from the memory if the program is determined not to be a series-type genre broadcasting program, and formulate a menu including a listing of the series-type genre broadcasting programs which have their plot synopsis data stored in a memory;
 a select unit to select at least one of the series-type genre broadcasting programs from the menu;
 a display unit to display stored plot synopsis data of a previously broadcasted program associated with the selected series-type genre broadcasting program; and
 wherein the memory stores the program synopses data.

15. The apparatus for organizing programming data according to claim 14, wherein the receiver is integrated into a television.

16. The apparatus for organizing programming data according to claim 14, wherein the receiver is integrated into a set top box.

17. The apparatus for organizing programming data according to claim 16, wherein the set top box is a satellite receiver box.

18. The apparatus for organizing programming data according to claim 17, wherein the satellite receiver box is a personal video recorder (PVR).

19. The apparatus for organizing programming data according to claim 16, wherein the set top box is a cable receiver box.

20. The apparatus for organizing programming data according to claim 14, wherein the memory is provided in a server connected to the control unit via the Internet.

21. The apparatus for organizing programming data according to claim 14, wherein the memory stores user set-up information including an ID and a password of a user.

22. The apparatus for organizing programming data according to claim 14, wherein the control unit determines whether a program is a series-type broadcasting program using additional information stored in the memory.

23. An apparatus for organizing programming data, comprising:
 a receiver to receive a data stream including a programming guide, which includes information describing aspects of broadcast programming;
 a memory to store the programming guide;
 a control unit to determine whether or not a program is a series-type genre broadcasting program by analyzing the genre information associated with the program in the programming guide if the program is determined to be a previously broadcasted program before the current time and extract program synopses data from the programming guide relating to the series-type genre broadcasting program if the program is determined to be a series-type genre broadcasting program, and delete only the information about the program from the memory if program is determined not to be a series-type genre broadcasting program, and formulate a menu including a listing of the series-type genre broadcasting programs which have their plot synopsis data stored in a memory;
 a select unit to select at least one of the series-type genre broadcasting programs from the menu;
 a display unit to display stored plot synopsis data of a previously broadcasted program associated with the selected series-type genre broadcasting program; and
 wherein the memory provided in a database server stores the extracted program synopses data.

24. The apparatus for organizing programming data according to claim 23, wherein the database server is accessed via a modem.

25. The apparatus for organizing programming data according to claim 24, wherein the database server is an Internet server.

26. The apparatus for organizing programming data according to claim 23, wherein the database server stores program synopses data for all series-type genre broadcasting programs.

27. The apparatus for organizing programming data according to claim 23, wherein a fee is charged for accessing the program synopses data.

\* \* \* \* \*